United States Patent [19]

Frazer

[11] 4,092,491
[45] May 30, 1978

[54] DIFFERENTIAL ENCODING AND DECODING SCHEME FOR DIGITAL TRANSMISSION SYSTEMS

[75] Inventor: Gerald Lee Frazer, Newton, N.H.

[73] Assignee: Bell Telephone Laboratories, Incorporated, Murray Hill, N.J.

[21] Appl. No.: 784,169

[22] Filed: Apr. 4, 1977

[51] Int. Cl.² .......................................... H04L 27/24
[52] U.S. Cl. .................................. 178/67; 325/38 A; 332/11 D; 340/146.1 R
[58] Field of Search ............. 178/67; 325/38 R, 38 A, 325/59, 60, 145, 320, 321, 344; 332/11 D, 10; 329/110, 137

[56] References Cited

U.S. PATENT DOCUMENTS

| | | | |
|---|---|---|---|
| 3,131,363 | 4/1964 | Landee et al. | 332/11 |
| 3,517,338 | 6/1970 | Herman et al. | 332/11 |
| 3,553,368 | 1/1971 | Rudolph | 178/67 |
| 3,806,647 | 4/1974 | Dohne et al. | 178/67 |
| 3,947,767 | 3/1976 | Kolke et al. | 325/38 A |
| 3,955,141 | 5/1976 | Lyon | 325/38 A |
| 4,055,727 | 10/1977 | Katoh | 178/67 |

Primary Examiner—Robert L. Griffin
Assistant Examiner—Michael A. Masinick
Attorney, Agent, or Firm—Bryan W. Sheffield

[57] ABSTRACT

Digital transmission systems operating over microwave radio generally employ phase modulation rather than amplitude modulation because phase modulation is less sensitive to non-linearities in the transmitter. Coherent demodulation is typically employed in the receiver to ensure maximum immunity to the thermal noise of the radio receiver. This, in turn, requires that the receiver include circuitry to recover an unmodulated carrier from the incoming digital signal for use as a phase reference in the demodulation process. Unfortunately, the phase of the recovered carrier is subject to ambiguities which may result in the demodulated digital signal being transposed and/or inverted, resulting in gross transmission errors. Differential encoding of the digital signal, prior to modulation, overcomes this problem but may create additional problems, such as the inability of the receiver to monitor transmission errors by means of the parity bits which are included in the digital signal to be transmitted. The instant invention comprises an encoding algorithm which encodes the digital signal prior to modulation so that phase ambiguities in the recovered carrier signal become unimportant, yet at the same time preserves the ability of the receiver to check for transmission errors. The algorithm comprises two separate but complementary encoding rules, one of which is employed if the last three outputs of the encoder are logical equivalents and the other if they are not. A similar decoding algorithm is employed at the receiver.

32 Claims, 18 Drawing Figures

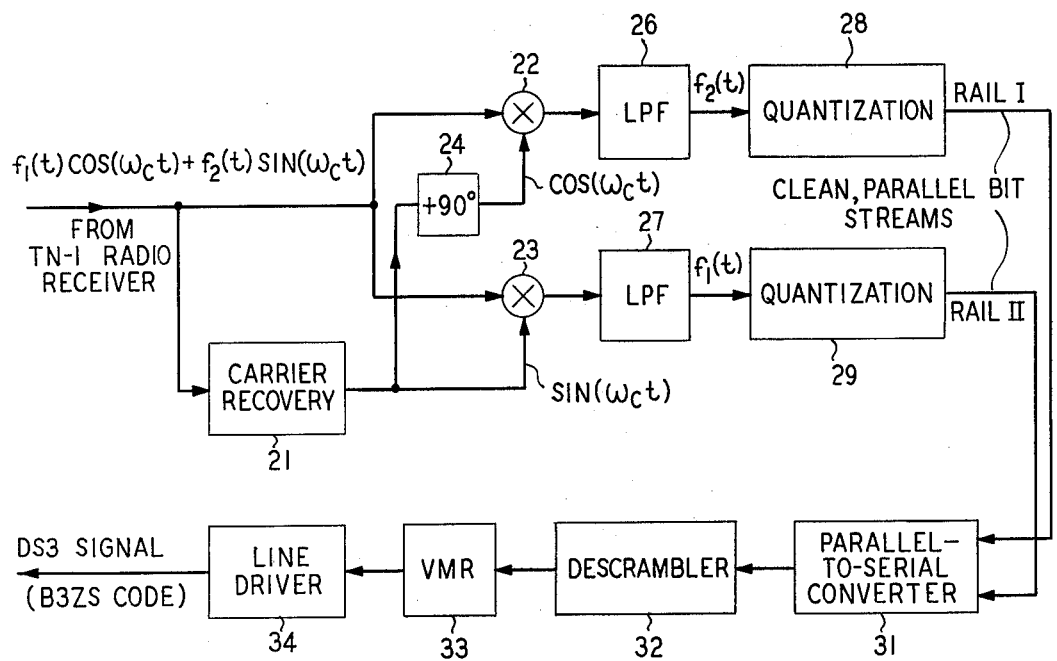
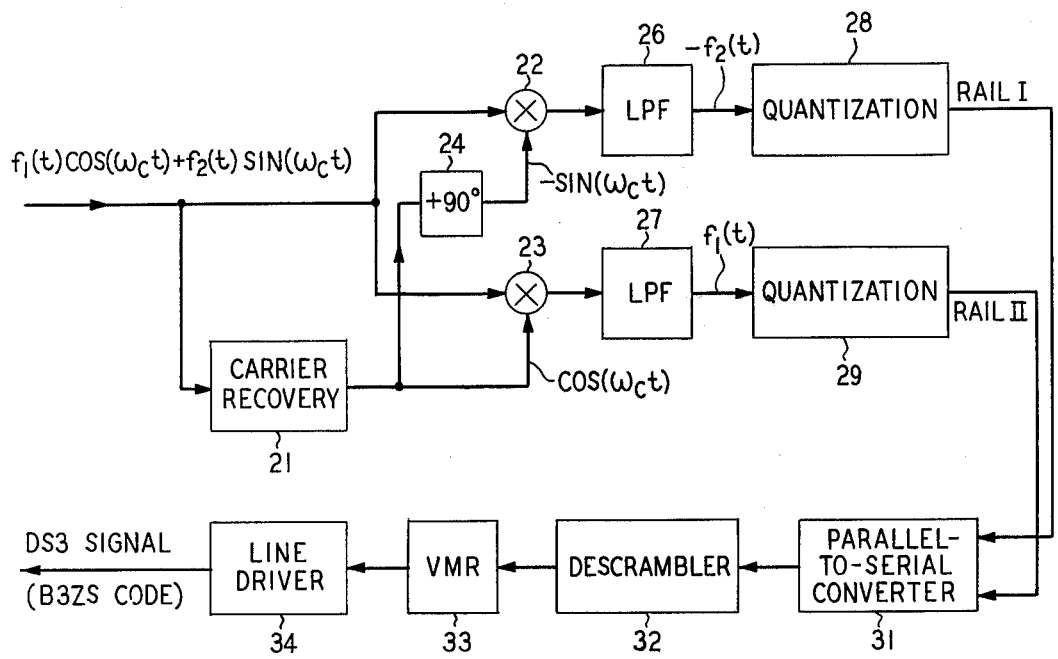

DIFFERENTIAL ENCODER

DIFFERENTIAL DECODER

\* THIS BIT REPRESENTS THE OUTPUT WHICH OCCURRED PRIOR TO THE START OF THE INPUT STREAM. FOR PURPOSES OF THE EXAMPLE, THE VALUE 1 WAS ARBITRARILY CHOSEN

DIFFERENTIAL ENCODER

DIFFERENTIAL DECODER

*THESE BITS REPRESENT THE LAST THREE OUTPUTS WHICH OCCURRED PRIOR TO THE START OF THE INPUT STREAM. FOR PURPOSES OF THIS EXAMPLE, THE VALUES SHOWN WERE CHOSEN ARBITRARILY

COMPUTER EXPERIMENT

ENCODER

DECODER

DIFFERENTIAL ENCODING AND DECODING SCHEME FOR DIGITAL TRANSMISSION SYSTEMS

BACKGROUND OF THE INVENTION a. Field of the Invention

Broadly speaking, this invention relates to the transmission of digital signals. More particularly, in a preferred embodiment, this invention relates to methods and apparatus for differentially encoding the bit stream in a digital transmission system of the type which employs one or more parity bits to detect errors which occur during the transmission process.

b. Discussion of the Prior Art

As is well known, in recent years considerable attention has been focused on the establishment of an all-digital transmission network. Such a network would carry digital data signals as well as digitized (PCM) analog voice signals. The microwave system known in the industry as the 3A Radio Digital System (3A-RDS) is destined to play an important role in the establishment of such a network.

The 3A Radio Digital Terminal (3A-RDT), a key part of the 3A Radio Digital System, is designed to carry the Bell System's DS3 level digital signal via the existing TN-1 microwave radio system which operates in the 11 GHz common carrier band. The 3A-RDT is essentially a modem which serves as an interface between the digital, bipolar, DS3 signal and the TN-1 microwave radio system. In addition to its function as a modem, the 3A-RDT contains the performance monitor for the system. The Violation Monitor and Remover (VMR) within the digital receiver makes use of the parity bits included in the DS3 signal to evaluate the bit error rate and to determine the need for automatic switching to a standby protection channel.

As in most digital radio systems, the non-linearity of the radio transmitter dictates the use of angle modulation rather than amplitude modulation. The 3A-RDT transmitter uses 4-level, phase-shift-keying of a 70 MHz carrier in order to generate the IF signal needed as an input to the TN-1 transmitter. In the digital receiver, coherent demodulation is used to provide maximum immunity to the thermal noise of the TN-1 radio receiver. This noise is normally negligible in comparison to the received signal level, but heavy rain along the TN-1 route can cause severe fading of 11 GHz signals, resulting in a substantial reduction in the signal-to-noise ratio at the output of the radio receiver. Under such circumstances, the noise immunity of the digital receiver becomes a primary factor governing the reliability of the system.

The need for differential encoding of the digital signal in 3A-RDS is linked to the coherent demodulation employed in the digital terminal receiver. As is well known, coherent demodulation of a phase-modulated signal requires that the receiver recover an unmodulated carrier from the received signal which is then used as a phase reference. Various considerations in the design of the 3A-RDT dictated that carrier recovery be accomplished by phase-locking a voltage-controlled oscillator (VCO) operating at the IF frequency to a constant-phase signal at four times the IF frequency, this latter signal being generated by passing a portion of the four-phase received IF signal through a X4 multiplier. Despite the fact that after the phase-locked loop acquires "lock" the VCO provides a good, constant-phase reference signal, this approach does have one drawback. Because the phase of a signal at the IF frequency (the VCO output) is controlled by a tone of four times the IF frequency (the X4 multiplier output), there is a four-fold ambiguity in the resulting VCO phase, i.e., the VCO phase may come to rest at the desired phase (corresponding to the phase of the carrier used for modulation at the digital transmitter) or it may come to rest in a phase state differing from the desired phase by any integral multiple of 90°. The consequence of this is that the receiver has no absolute phase reference, but has instead a reference against which only phase changes can be measured. Of course, this problem is not unique to 3A-RDS but is shared by many digital transmission systems using 4-phase modulation. Fortunately, it is well known that differential encoding of the digital signal can be used to ensure that the information is transmitted as phase changes, so that an absolute phase reference at the receiver is unnecessary.

Had the problem of recovered carrier phase ambiguity been the only constraint on the choice of a differential encoding scheme for 3A-RDS, no invention would have been needed. Known differential encoding schemes are more than adequate for encoding the digital information so that it is represented by phase changes rather than by any absolute quantity. However, the 3A-RDS system imposes an additional constraint on the choice of a suitable differential encoding scheme because of the requirement that the digital terminal receiver determine the bit error rate by monitoring the parity bits included in the DS3 bit stream. Obviously, the monitoring of the parity bits can only take place after differential decoding and, when conventional differential codes are used, it has been found that the decoding procedure alters the characteristics of the error occurrences in such a way that errors in the bit stream at the output of the decoder occur only in even numbers. This is a serious problem with 3A-RDS since the DS3 parity bits are implemented in such a way that even numbers of errors cannot be detected.

For a period of time, no differential code could be found which was compatible with the need to detect errors by monitoring the DS3 parity bits. During this period, the preliminary design of the 3A-RDT resolved the problem of phase ambiguity in the recovered carrier by using a "leaked" carrier approach rather than differential encoding. This approach consisted of transmitting a very small amount of unmodulated carrier signal along with the phase-modulated data signal. The carrier signal was so weak as to preclude its detection and use as a phase reference directly, but by first establishing a phase reference via the X4 multiplier method, the phase of the leaked signal could be sensed. This information was then used to correct for the possibly erroneous phase state of the phase reference generated by the X4 multiplier method. Unfortunately, the high degree of isolation needed between the weak, leaked carrier signal and various high-level signals in the receiver made this system impractical. Furthermore, the use of a higher level leaked carrier is not possible because the spurious tones generated by non-linearities in the TN-1 transmitter would probably violate FCC emission limitations.

Because the known differential codes were incompatible with the requirement that the bit error rate be determined by monitoring the DS3 parity bits, and because of the impracticality of the leaked carrier approach, the problem of the phase ambiguity in the recovered carrier threatened the viability of the 3A-RDT design. It was at this juncture that the new differential encoding scheme disclosed and claimed herein was invented for use with 3A-RDS and other similar systems suffering from the same problem.

SUMMARY OF THE INVENTION

This new encoding scheme provides the rugged, digital advantages of differential encoding to resolve the problem of recovered carrier phase ambiguity, replacing entirely the weaker analog technique of a leaked carrier, while at the same time preserving all the capabilities possessed by the 3A-RDT to measure bit error rate. The preservation of the capability to detect errors by monitoring the DS3 parity bits is possible because errors at the output of the differential decoder disclosed and claimed herein do not always occur in even numbers. They are, instead, statistically distributed between odd numbers and even numbers in a known fashion. Whenever the number of errors is odd, the DS3 parity scheme will register a violation. Detection of all occurrences of odd numbers of errors and precise knowledge of the statistical distribution of number of errors per error occurrence are sufficient to allow a calculation of the bit error rate.

More specifically, an illustrative embodiment of the invention comprises an improved method of transmitting a digital signal from a first to a second location. The method comprises the steps of, at said first location, splitting the digital signal into first and second digital signals at half the bit rate of the original digital signal, the first and second digital signals being carried on first and second parallel data rails, respectively. The next step calls for phase-modulating a carrier wave of fixed frequency and amplitude with the first and second digital signals on the data rails and then transmitting the modulated carrier wave from the first to the second location. The improvement in this method comprises the steps of, prior to said phase-modulating step, differentially encoding the digital signal on each data rail in a differential encoder according to the following encoding algorithm:

If the last three outputs of the differential encoder were all the same, implement encoding Rule I, otherwise implement encoding Rule II.

ENCODING RULE I (a) If the input to the encoder is a first logical condition, make the output of the encoder the logical equivalent of the previous output;

(b) If the input to the encoder is a second logical condition, make the output of the encoder the logical complement of the previous output.

ENCODING RULE II (a) If the input to the encoder is said first logical condition, make the output of the encoder the logical complement of the previous output;

(b) If the input to the encoder is said second logical condition, make the output of the encoder the logical equivalent of the previous output.

An analogous decoding algorithm is employed in the receiving location.

The invention and its mode of operation will be more fully understood from the following detailed description, when taken with the appended drawings, in which:

DESCRIPTION OF THE DRAWINGS

FIG. 2 is a block schematic drawing of a portion of an illustrative prior art digital receiver;

FIG. 3 is a block schematic diagram of the receiver shown in FIG. 2 illustrating the effect of incorrect phase for the recovered carrier signal used for demodulation;

DETAILED DESCRIPTION OF THE INVENTION

As an aid to understanding the need for a differential code, a brief discussion of the basic operation of the 3A-Radio Digital System Terminal (the 3A-RDT) is appropriate. The operation of this terminal will be described with reference to the functional block diagrams of FIGS. 1 and 2. The diagrams shown in FIGS. 1 and 2 and the following description should not be considered complete, however, since only those details which are germane to an understanding of the differential coding scheme are included. In particular, the apparatus employed to "leak" a portion of the carrier onto the digital system is not shown.

The function of the 3A-RDT transmitter is to incorporate the information content of a DS3 level data signal into an IF bandpass signal centered at 70 MHz. Such an IF signal is suitable for transmission over a microwave radio system, for example the 11 GHz system known in the industry as TN-1. As shown, the input bit stream is a 44.736 Mb/s DS3 level bipolar digital signal with three-zero substitution (B3ZS). A line receiver 10 converts the B3ZS signal into a unipolar bit stream at the appropriate voltage levels for the logic family used within the terminal. Following the line receiver is a scrambler 11, typically a chain of bistable multivibrators and associated logic, whose function is to ensure that the digital signal is suitably randomized so that the transmitted power spectrum will contain no discrete spectral lines due to statistically peculiar bit patterns.

The output of scrambler 11 is a serial, unipolar bit stream which is applied to serial-to-parallel converter 12 where it is divided by alternately placing bits from the serial stream onto two parallel data rails, rail I and rail II, respectively. Both data rails carry 22.368 Mb/s bit streams and, in the 3A-RDS system, the pulses on the rails are offset by one-half baud interval with respect to each other; that is, transitions on one rail occur at the same times as the midpoints of data symbols on the other rail. This fact will become important later in the discussion.

Figure 1:
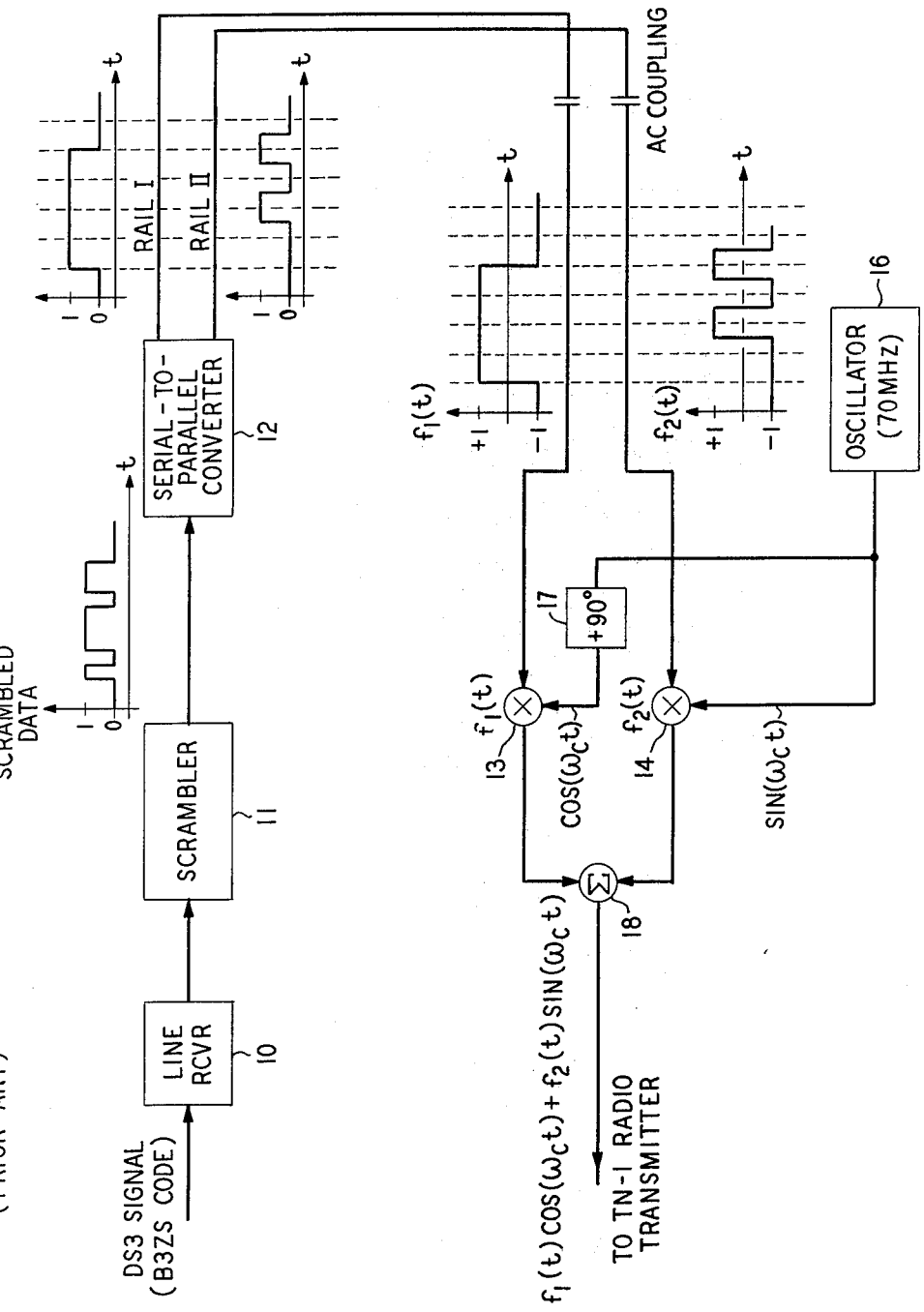
FIG. 1 is a block schematic drawing of a portion of an illustrative prior art digital transmitter.

Prior to modulation, the DC components are removed from the signals on both rails so that a logical "1" is represented by a positive voltage and a logical "0" is represented by a negative voltage, shown in FIG. 1 as $+1$ and $-1$, respectively. The two rails are connected to a pair of modulators 13, 14 and quadrature amplitude modulate (QAM) a 70-MHz carrier supplied from an oscillator 16. The two resulting signals are then summed in an adder 18 to complete the modulation process.

Despite the fact that the transmitter's output signal is formed by QAM techniques, it is fully equivalent to a digitally-phase-modulated signal with four phase states. The output of each of the product modulators 13 and 14 is a sinusoid which changes phase by 180° whenever the data input to the modulator changes. The output of the rail II product modulator 14 is either in-phase with the 70-MHz signal from oscillator 16 or 180° out-of-phase with it and the phase of the output from rail I modulator 13 is ±90° different than the signal from oscillator 16 (due to the 90° carrier phase shift caused by phase shift network 17). The result of summing these two signals is a 4-level, phase-shift-keyed (PSK) signal with phase states which differ from each other by integral multiples of 90°. Due to the offset between the data symbols on the two rails, changes in the phase of the IF signal occur only in 90° increments. The term "offset" PSK has been coined to distinguish this modulation scheme from the more traditional 4-phase modulation scheme which allows phase changes of 180° as well as ±90°.

As shown in FIG. 2, after transmission over the microwave radio system, the 70-MHz IF output of the TN-1 radio receiver is demodulated by the 3A-RDT receiver. By processing a portion of the incoming IF signal in a carrier recovery circuit 21, the data information is removed leaving only a replica of the 70-MHz carrier used for modulation purposes in the transmitter. This reference carrier is fed to the pair of demodulators 22 and 23 whose outputs are low-pass filtered in filters 26 and 27 to complete the coherent detection process.

The signals at the outputs of filters 26 and 27 are, in general, corrupted by noise and intersymbol interference which must be removed by the process of regeneration. To that end, the outputs from filters 26 and 27 are applied to quantization circuits 28 and 29, respectively. At the appropriate times, as determined by a timing recovery circuit (not shown), the signal on each data rail is sampled and quantized as to its representation of a logical "1" or a logical "0". Following quantization in quantization circuits 28 and 29, the two rails once again carry clean, parallel, unipolar bit streams with the one-half bit interval offset described earlier. A parallel-to-serial converter 31 interleaves the two rails to form a single, serial bit stream which is passed through a descrambler 32 which performs the inverse of the digital processing which occurred in scrambler 11 at the transmitter. After descrambling, the performance of the system is monitored by a Violation Monitor and Remover 33 (VMR) which detects errors by monitoring the parity bits in the DS3 signal. Finally, the serial bit stream is recoded into B3ZS format by a line driver 34.

As shown in FIG. 2, the carrier recovery circuit 21 ideally feeds demodulators 22 and 23 with replicas of the sinusoids which were used to drive modulators 13 and 14 at the transmitter. In this case, the rail I output, $f_1(t)$, will be the same as the rail I input at the transmitter. Likewise, the rail II output, $f_2(t)$, will correspond to the rail II input at the transmitter.

However, operation of carrier recovery circuit 21 will not always cause the demodulators to be fed with sinusoids of the same phase as those which were used for modulation. Rather, the phase of the demodulating sinusoids may be different from those used for modulation by any integral multiple of 90°. This happens because carrier recovery circuit 21 in the 3A-RDT receiver uses the X4 multiplication method of carrier recovery in which a portion of the 4-phase IF signal at the receiver input is tapped-off and passed through a X4 multiplier stage. The useful portion of the multiplier's output is a constant-phase tone at four times the IF frequency, i.e., 280 MHz. Next, using a phase-locked loop and a special phase detector, this 280 MHz signal is used to phase-lock a VCO operating at the 70-MHz IF frequency. The VCO output then comprises the recovered carrier signal which is fed to the demodulators.

For the purpose of explaining the four-phase ambiguity which may occur in this process, it is important to note that the phase of a sinusoid at the IF frequency (i.e., the VCO output) is controlled by the phase of a sinusoid at four times the IF frequency (i.e., the output of the X4 multiplier). In this arrangement there are four possible phases of the IF signal, each separated from the other by multiples of 90°, which bear identical relationships to the sinusoid at four times the IF frequency. Unfortunately, the phase-locked loop has no way of distinguishing one phase state of the IF signal from another and any one of the four states could be the end result when the loop acquires lock.

As an example of the effects of the phase ambiguity in the recovered carrier, suppose, as in FIG. 1, that modulator 13 is fed by $f_1(t)$ and $\cos(\omega_c t)$, and modulator 14 is fed by $f_2(t)$ and $\sin(\omega_c t)$. In the receiver, as shown in FIG. 3, the carrier recovery circuit may lock up in such a way that the reference carrier fed to demodulator 23 is $\cos(\omega_c t)$ while the reference carrier fed to demodulator 22 is $-\sin(\omega_c t)$. As a result, the rail I output would be $-f_2(t)$ and the rail II output would be $f_1(t)$. The important thing to note is that the resulting signals are not distorted waveshapes; rather, the effect of having the incorrect phase for the recovered carrier is to switch to rail II the digital information which should be carried by rail I, and vice versa and, in addition, to invert $f_2(t)$.

The following table summarizes the rail I and rail II outputs as a function of the recovered carrier state. Only the first state yields the desired outputs on the proper rails, that is, $f_1(t)$ on the rail I and $f_2(t)$ on rail II. However, as in the example previously cited, the remaining three states merely have the effect of switching the information originally carried on one rail to the other rail, and/or inverting one or both of the signals.

TABLE A

3A-RDT TRANSMITTER

INPUTS TO MODULATOR 13 (RAIL I) { DATA: $f_1(t)$ CARRIER: $\cos(\omega_c t)$

INPUTS TO MODULATOR 14 (RAIL II) { DATA: $f_2(t)$ CARRIER: $\sin(\omega_c t)$

3A-RDT RECEIVER

| PHASE STATE NO. | RAIL I CARRIER INPUT | RAIL II CARRIER INPUT | RAIL I DATA OUTPUT | RAIL II DATA OUTPUT |
|---|---|---|---|---|
| 1* | $\cos(\omega_c t)$ | $\sin(\omega_c t)$ | $f_1(t)$ | $f_2(t)$ |
| 2 | $-\sin(\omega_c t)$ | $\cos(\omega_c t)$ | $-f_2(t)$ | $f_1(t)$ |
| 3 | $-\cos(\omega_c t)$ | $-\sin(\omega_c t)$ | $-f_1(t)$ | $-f_2(t)$ |
| 4 | $\sin(\omega_c t)$ | $-\cos(\omega_c t)$ | $f_2(t)$ | $-f_1(t)$ |

*DESIRED STATE

The problem of compensating for the effects shown in Table A is simplified by the fact that the 3A-RDS system is insensitive to the transposition of an information bit stream on one rail in the transmitter to the opposite rail in the receiver. This insensitivity stems from the fact that the 3A-RDT transmitter establishes offset pulses on the two data rails. If the transitions on both rails occurred at the same time, the parallel-to-serial converter 31 in the receiver would be forced to make a decision about which bit from which rail should come first in the interleaved serial bit stream. However, since the transitions on one rail occur at the midpoints of the data pulses on the other rail, the parallel-to-serial converter merely interleaves the bits from the two parallel streams together in the order that they arrive. This system works even if the rail I input erroneously appears on the rail II output, and vice versa. Thus, the only adverse effect of the phase ambiguity in the recovered carrier signal is the unpredictable inversions of the data which can occur. As will be explained, differential coding may be used to overcome the effects of these inversions.

The problem of the phase ambiguity which exists in the recovered carrier signal can be solved by the use of differential encoding. To simplify an understanding of the invention disclosed and claimed herein, we will first discuss a relatively straightforward encoding algorithm. Then, after this algorithm is thoroughly mastered, we shall consider the more complicated version which must be used with 3A-RDS to ensure compatibility between the encoding technique and the hardware employed to measure bit error rates using the DS3 parity bits.

Figure 4:
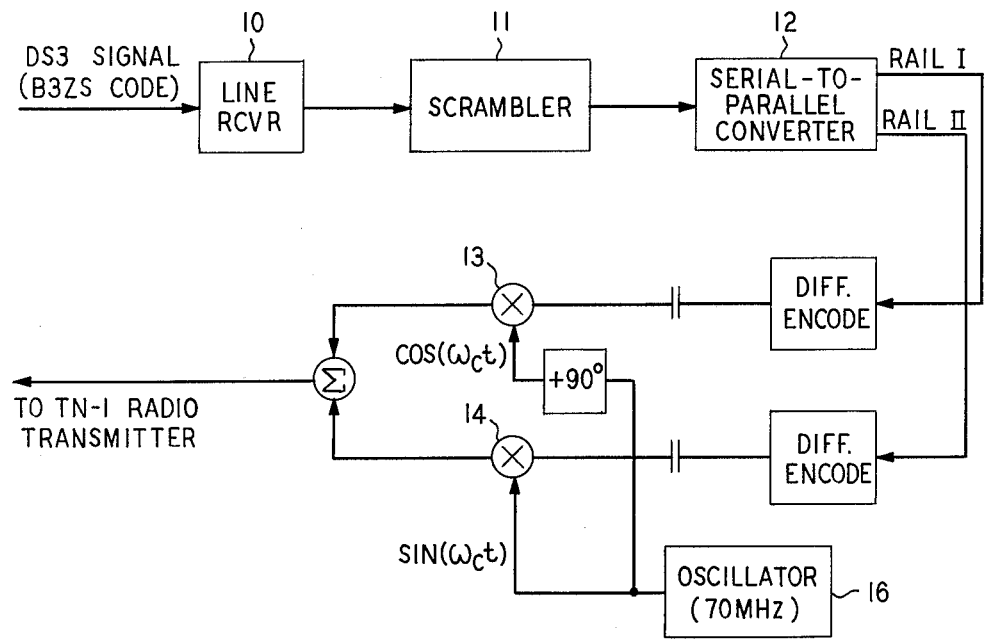
FIG. 4 is a block schematic diagram of a digital transmitter according to the invention which differentially encodes the digital bit stream prior to modulation.
Figure 5:
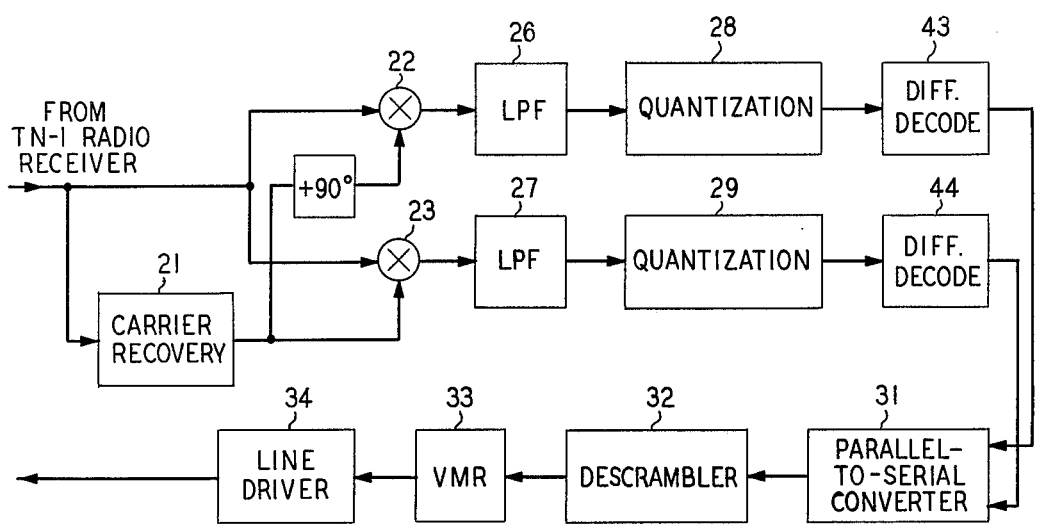
FIG. 5 is a block schematic diagram of a digital receiver according to the invention which differentially decodes the encoded bit stream from the transmitter shown in FIG. 6.

As shown in FIG. 4, in the instant invention differential encoding is done in the transmitter immediately following serial-to-parallel converter 12. Each rail is encoded separately, using a pair of differential encoders 41 and 42, respectively. Similarly, as shown in FIG. 5, in the receiver each rail is decoded separately by means of a pair of differential decoders 43 and 44 respectively positioned immediately upstream of parallel-to-serial converter 31. The inputs and outputs of the encoding and decoding circuits are standard unipolar logic signals and the inclusion of these circuits does not affect the offset of the data on rail I with respect to the data on rail II.

As previously stated, the differential code employed must compensate for the possibility that the signal on either or both rails might be inverted as a result of an error in the phase of the recovered carrier. Whenever such an inversion occurs, the logical "1's" sent by the transmitter appear as logical "0's" at the receiver, and vice-versa. The differential code to be discussed takes advantage of the fact that, whether the signal on a given rail is inverted or not, one property of the received signal is the same as that of the transmitted signal; that is, if two adjacent bits were logical complements at the transmitter then they will still be logical complements when they arrive at the receiver. Likewise, if the adjacent bits were logically equivalent at the transmitter then they will still be logically equivalent when they arrive at the receiver. A transmitter-receiver combination which is designed in such a way that the receiver derives information from the similarity or dissimilarity of adjacent bits would then be immune to the problem of inverted rail signals.

Figure 6:
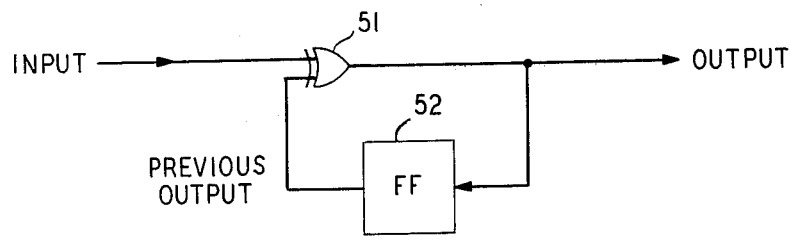
FIG. 6 is a block schematic diagram of a known differential encoder.
Figure 7:
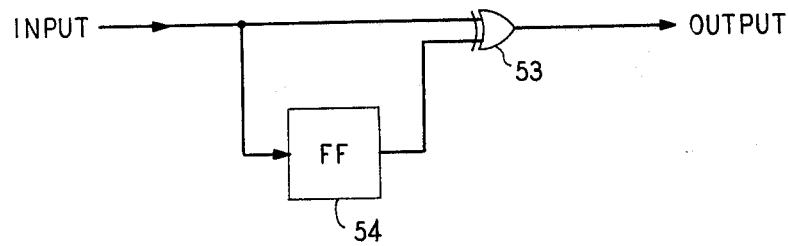
FIG. 7 is a block schematic diagram of a known differential decoder.

Such a transmitter-receiver combination could utilize the differential encoder and decoder respectively illustrated in FIGS. 6 and 7. For use with 3A-RDS, one such encoder would be associated with each rail in the transmitter, as shown in FIG. 4, and one decoder would be associated with each rail in the receiver, as shown in FIG. 5.

As shown, the encoder comprises an exclusive OR-gate 51 having one input connected to the data rail from the serial-to-parallel converter (FIG. 4) and an output which connects to one of the modulators 13 or 14 (FIG. 4). A bistable multivibrator 52 interconnects the output of OR-gate 51 with the other input thereof. Multivibrator 52 provides a delay which corresponds to one bit interval.

In like fashion, the decoder comprises an exclusive OR-gate 53 having one input connected to the data rail from either quantization circuit 28 or 29 (FIG. 5) and an output which connects to one input of the parallel-to-serial converter 31 (FIG. 5). The data rail is also connected to the input of a multivibrator 54 whose output is connected to the other input of OR-gate 53.

The encoding algorithm effectuated by the hardware configuration shown in FIG. 6 is as follows:

If the input to the encoder is a logical "0", make the output of the encoder the same as the previous output.

If the input to the encoder is a logical "1", make the output of the encoder the logical complement of the previous output. More concisely, a logical "0" is transmitted as logically equivalent adjacent bits, and a logical "1" is transmitted as logically complementary adjacent bits. The corresponding decoding algorithm effectuated by the hardware configuration shown in FIG. 7 is as follows:

If the input to the docoder is the same as the previous input, make the decoder output a logical "0".

Figure 8:
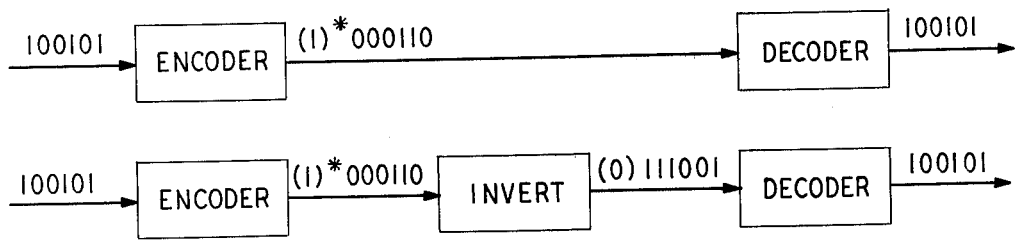
FIG. 8 is a functional diagram illustrating, on a hypothetical bit stream, how the encoder/decoder combination of FIGS. 6 and 7 is insensitive to bit stream inversion.

If the input to the decoder is the logical complement of the previous input, make the decoder output a logical "1". FIG. 8 includes an example of a bit stream to be transmitted; the result after differential encoding; and the output of the decoder. Results are shown (FIG. 8a)

for the case of "normal", uninverted transmission of the data and for the case of inverted transmission (FIG. 8b). In both cases, the decoder output is the same as the input bit stream in the transmitter, the desired result.

More specifically, the bit stream to be transmitted is assumed to be 100101. Arbitrarily assuming that the encoder output which occurred prior to the encoding of the input bit stream was a "1", application of the above encoding algorithm yields the encoded bit srtream 1000110. Applying the rules of the decoding algorithm to this encoded bit stream yields back the original bit stream 100101, as expected.

Assume now that, due to some unspecified phase inversion, the encoded bit stream 1000110 is inverted and becomes 0111001. Application of the same decoding algorithm again yields back the original bit stream 100101, as desired.

Figure 9:
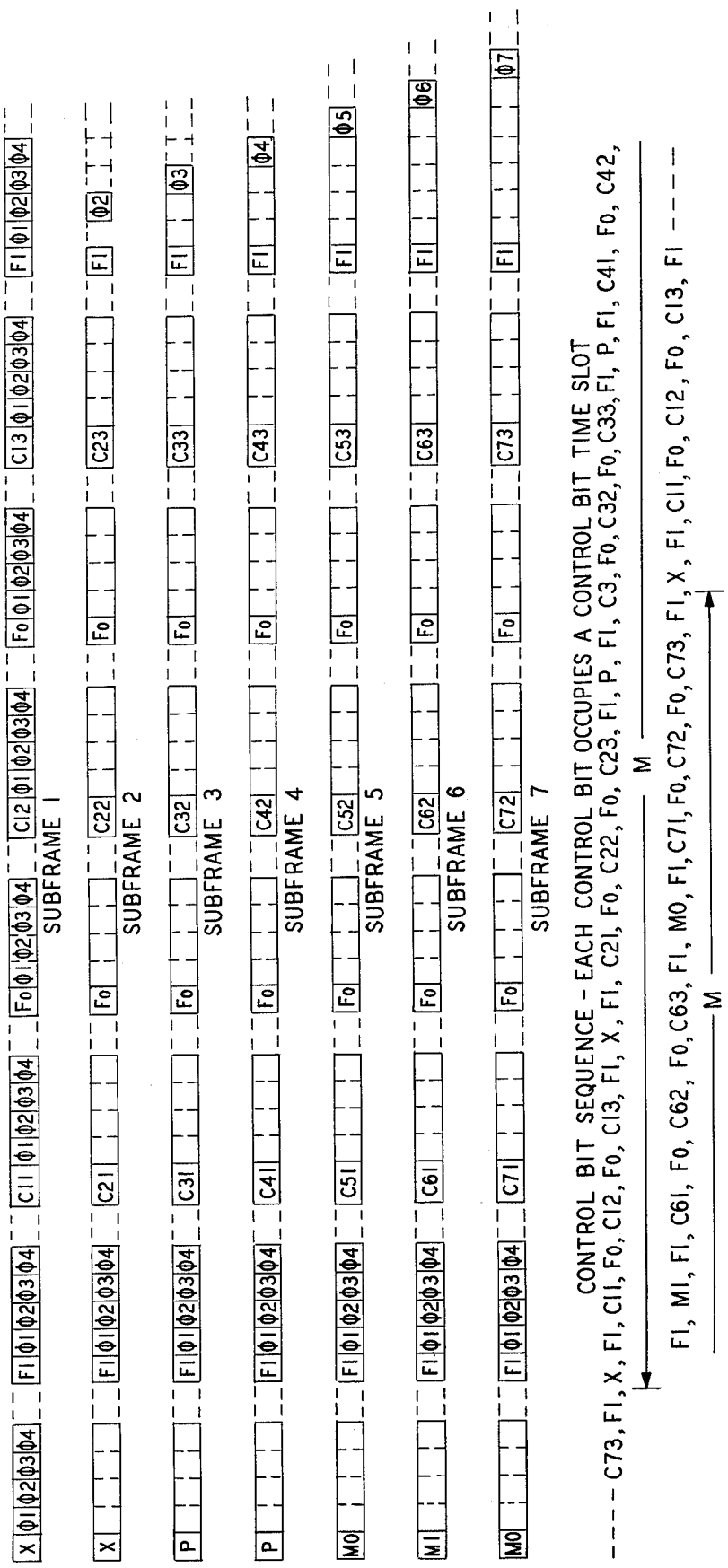
FIG. 9 is a diagram which illustrates the format of the DS3 level bit stream.

The differential code described above clearly compensates for the ambiguity in the phase of the recovered carrier and the possibility of inversion of one or both data rails. However, use of this code in the 3A-RDS system would introduce a new problem; that is, bit errors occurring because of noise in the transmission system would be affected by the differential decoder in such a way that they could not be detected by the use of the parity bits in the DS3 signal, a serious shortcoming. To more fully appreciate this problem, the DS3 parity bits, their use in detecting errors, and the error multiplication caused by the single differential decoder previously discussed will now be described. It should be stressed that a complete understanding of the DS3 bit stream format or the 3A-RDT is not necessary to an understanding of the instant invention. However, for the sake of completeness, FIG. 9 shows the DS3 bit stream format. It will be noted that each DS3 bit is either a "1" or a "0" and that one bit is transmitted during each time slot, that is at a rate of 44.736 Mb/s. In order for the data to be intelligible, timing and control functions must, of course, be recognizable and the information bits are referenced to these functions. In the DS3 bit stream, the timing and control functions are transmitted as data bits, commonly referred to as housekeeping bits. A DS3 superframe is the smallest grouping of bits which contain data for each of the 672 voice circuits contained in DS3 as well as the housekeeping bits. As shown, the DS3 superframe contains 4760 bit spaces which are occupied by 4704 information bits and 56 housekeeping bits. The superframe is also referred to as an M frame and is made up of seven M subframes. The M subframes, in turn, are made up of eight smaller subframes of 85 bits each. The first bit in each of the 85-bit subframes is a housekeeping bit and the remaining bits are information bits. In the control bit sequence, every other 85-bit subframe has an F-bit (framing bit) as a first bit, and the F-bit sequence is always 11001100....

Each M subframe starts with an M-bit as the first bit in an 85-bit subframe. The 85-bit subframe in which the M-bit appears always follows a "1" in the F sequence and is always followed by a "1" in the F sequence. The M bit sequence is typically 11PP010, where P is a parity bit and may be either a "1" or a "0", but both parity bits must always be the same. For example, in the typical situation the M-bit sequence may be either 1111010 or 1100010. Each superframe is approximately 106 μS in duration. For any given system which uses the DS3 format, the control bits in the M sequence and the F sequence will be fixed patterns, except for the parity bits. The remainder of the control bits do not have a fixed pattern.

Parity is taken over the 4704 information bits in each superframe. If the number of "1's" is even, the parity bits are "0's". If the number of "1's" is odd, the parity bits are "1's". In a given M-frame, the value of the pair of parity bits is governed by the 4704 information bits in the previous M-frame. More specifically if the modulo-2 sum of the information bits in the previous frame is "0", then both parity bits are "0's", and if the modulo-2 sum of the information bits is "1", then both parity bits are "1's".

In the 3A-RDT receiver, the Violation Monitor and Remover calculates the modulo-2 sum of all information bits in an M-frame and then compares the result with the pair of parity bits in the following M-frame. If the information bits are transmitted without error, then the modulo-2 sum computed in the receiver will be in agreement with the parity bits. If a single error, or any odd number of errors, occurs during the transmission of the information bits, the modulo-2 sum computed in the receiver will disagree with the parity bits in the next M-frame and the Violation Monitor and Remover will register a parity violation. However, if the transmission of the information bits results in an even number of errors, the modulo-2 sum computed in the receiver will agree with the parity bits and the Violation Monitor and Remover will have no indication that errors have occurred. Thus, in order to effectively utilize parity violations to calculate the bit error rate, the design of the digital receiver must not include circuitry which would systematically alter the random occurrence of errors in such a way that even numbers of errors predominate in the bit stream monitored by the Violation Monitor and Remover. Digital processing, such as is done in a descrambler or in a differential decoder, is of primary concern.

A 3A-RDT receiver which does not employ differential coding, for example the prior art receiver shown in FIG. 2, is not subject to the occurrence of even numbers of errors in an M-frame (actually, even numbers of errors can occur but they are so infrequent as to be of no practical consequence). Errors caused by noise introduced by the TN-1 receiver occur randomly and there will, thus, be no correlation between the errors on rail I and the errors on rail II. Since the error rates of interest in the 3A Radio Digital System are on the order of $10^{-6}$, seldom will a block of 4704 information bits have more than one error. The above argument, which leads to the conclusion that in general there will be a parity violation for virtually every bit error, would be correct for the signal appearing at the output of parallel-to-serial converter 31 (FIG. 2) if the Violation Monitor and Remover could measure parity violations on that signal. However, the signal at that point has not been descrambled and is unusable as far as the Violation Monitor and Remover is concerned. The self-synchronizing descrambler 32 which precedes the Violation Monitor and Remover has the property that for every isolated error present at its input, there will be three errors at its output, the last of which occurring 17 bits after the first. Since 17 << 4704, it is extremely probable that all three errors will fall within the same M-frame and, thus, one parity violation will be produced. Even if two of the errors fall within the same M-frame, the remaining error will fall in a differenet M-frame, again producing one parity violation. Thus, while the descrambler triples the number of errors, present in the incoming bit stream, it never alters the number of errors in such a way that they fail to produce a parity violation.

Unfortunately, when the differential encoding and decoding apparatus shown in FIGS. 4 and 5 is added to the terminal the measurement of bit errors by means of the DS3 parity bits is no longer possible. The reason for this is that whenever noise is present at their inputs, the quantizing circuits 28 and 29 (FIG. 5) still generate errors randomly and, as previously discussed, this will nearly always mean that the errors occur singly for the low error rates of interest with 3A-RDS. However, careful analysis of the previously discussed decoding algorithm leads to the conclusion that a single error at the input to differential decoder 43 or 44 will always result in two errors occurring at the output of the decoder. Referring to FIG. 8, this statement can be justified by noting that one output error will be caused when the erroneous bit is fed directly into the decoder input and another output error will occur one bit interval later when the contents of the delay element (multivibrator 54) is in error. Following parallel-to-serial conversion, descrambler 32 will turn this pair of errors into six errors which, with a high degree of probability, will all be in the same M-frame and will, thus, result in no parity violation. This incompatibility between the previously discussed differential coding algorithm and the DS3 parity bits was the motivation for my invention of a new differential encoding scheme which possesses the property that odd numbers of errors will appear at the decoder output, rather than even numbers of errors.

The differential encoding scheme disclosed and claimed herein does not entirely eliminate the occurrence of even numbers of errors at the decoder's output. However, as will be explained, a significant and predictable percentage of the error occurrences result in an odd number of errors at the decoder output. This is entirely acceptable in practice since the use of an appropriate correction factor allows calculation of the bit error rate from a direct measurement of the DS3 parity violations.

As was the case with the encoding algorithm previously discussed, separate encoders are required on both rails of the transmitter and separate decoders are required on both rails of the receiver. In other words, the block schematic diagrams shown in FIGS. 4 and 5 remain applicable although the particular logic circuitry of the encoder and decoder will change. A description of the new encoding scheme and its properties will begin with a statement of the encoding and decoding algorithms followed by arguments which justify the use of such algorithms to overcome the possibility of inversion of one or both rails of data within the 3A-RDT receiver. It will then be shown that, unlike the differential encoding scheme described earlier, a single error at the input to the new decoder will produce an odd number of errors at the output as often as it produces an even number of errors at the output. In fact, the entire distribution of the number of output errors will be given, which is invaluable in determining the conversion factor needed to compute bit error rate from the occurrence of parity violations. Finally, a brief description of some illustrative circuit implementations of the encoder and decoder will be given.

Figure 10:
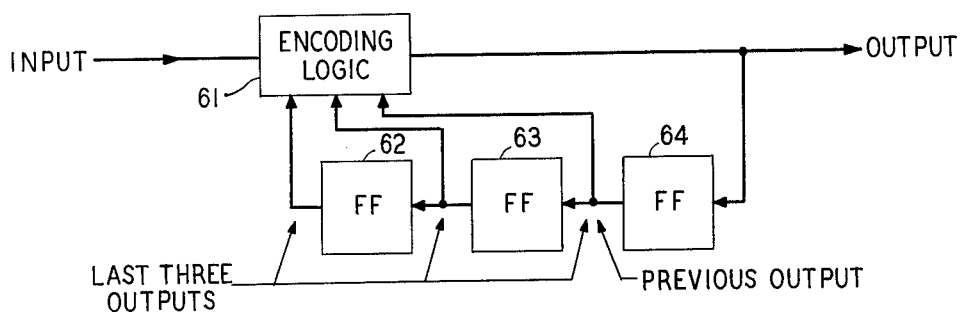
FIG. 10 is a block schematic diagram of an illustrative differential encoder according to the invention.
Figure 11:
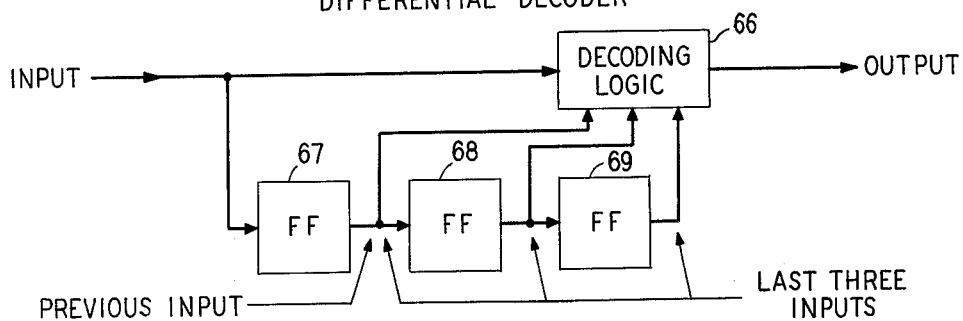
FIG. 11 is a block schematic diagram of an illustrative differential decoder according to the invention.

As might be expected, the differential encoding and decoding algorithms disclosed and claimed herein are lengthier than the algorithms previously discussed. FIGS. 10 and 11, which are block schematic diagrams of the encoding and decoding apparatus, as well as FIG. 12, will be helpful in understanding the following statement of the algorithms.

ENCODING ALGORITHM

If the last three outputs of the differential encoder were all the same, the encoding logic should implement encoding Rule I. If they were not all the same, the encoding logic should implement encoding Rule II.

Encoding Rule I:
(a) If the input to the encoder is a logical "0", make the output of the encoder the same as the previous output.
(b) If the input to the encoder is a logical "1", make the output of the encoder the logical complement of the previous output.

Encoding Rule II:
(a) If the input to the encoder is a logical "0", make the output of the encoder the logical complement of the previous output.
(b) If the input to the encoder is a logical "1", make the output of the encoder the same as the previous output.

DECODING ALGORITHM

If the last three inputs to the differential decoder were all the same, the decoding logic should implement decoding Rule I. If they were not all the same, the decoding logic should implement decoding Rule II.

Decoding Rule I:
(a) If the input to the decoder is the same as the previous input, make the decoder output a logical "0".
(b) If the input to the decoder is the logical complement of the previous input, make the decoder output a logical "1".

Decoding Rule II:
(a) If the input to the decoder is the logical complement of the previous input, make the decoder output a logical "0".
(b) If the input to the decoder is the same as the previous input, make the decoder output a logical "1".

It should be apparent that encoding Rule I is the mate to decoding Rule I, and encoding Rule II is the mate to decoding Rule II. Taken as a pair, encoding Rule I and decoding Rule I are exactly the same as the differential code previously described. The pair of rules formed by encoding Rule II and decoding Rule II are the same as the previously discussed differential code with the exception that the criteria for making outputs logical complements or logical equivalents of previous outputs have been reversed.

Figure 12:
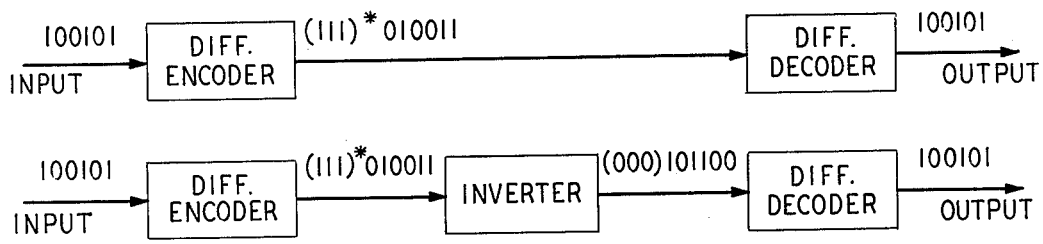
FIG. 12 is a functional diagram, similar to FIG. 8, which illustrates on a hypothetical bit stream how the encoder/decoder combination of FIGS. 10 and 11 is insensitive to bit stream inversion.

Based on the example discussed earlier, it should be apparent that encoding Rule I and decoding Rule I will work together properly, regardless of whether or not the data entering the decoder has been inverted. Encoding Rule II and decoding Rule II will be seen to be similarly insensitive to inversions of the data entering the decoder. The interesting question that remains with respect to the insensitivity of the new algorithms to inversion of the data, has to do with the switching back and forth from Rule I to Rule II. If the data which is applied to the decoder is inverted, will the proper decoding rule be chosen at the proper time? It becomes evident that the proper rule will be chosen if one notes that the criterion for choosing the decoding rule is based on three successive bits being logical equivalents or logical complements, a property which is immune to inversion. FIG. 12 includes an example of a bit stream which undergoes differential encoding and decoding with the same decoded result when the input to the decoder is inverted as when it is not.

More specifically, assume that the bit stream to be transmitted is again 100101. Assume further that the last three outputs of the encoder were 111. This assumption is entirely arbitrary but ensures that, in this example at least, both encoding rules will be implemented. Because the last three encoder outputs were the same, encoding Rule I(a) is applied; thus, the next output of the encoder is a logical "0". Now, since the last three outputs of the encoder are no longer all the same, encoding Rule II(a) is implemented. In like fashion, the remaining bits in our test word are encoded, the final result being (111)010011.

Application of Rules II(a) and II(b) will then decode the test word to its original format 010011, as expected. Assume now that, due to some unspecified phase reversal, the encoded bit stream is inverted from (111)010011 to (000)101100. It will readily be seen that the decoding algorithm will once again yield the desired test word 100101.

Turning to FIG 10, it will be seen that one illustrative embodiment of a differential encoder to implement the new encoding algorithm comprises an encoding logic circuit 61 having an input connected to one output of serial-to-parallel converter 12 (FIG. 4) and an output connected to modulator 13 or 14 (FIG. 4). A cascaded chain of bistable multivibrators 62–64 connect the output of logic circuit 61 to the input thereof and, in addition, intermediate outputs of the multivibrator chain are also connected to logic circuit 61. The specific logic implementation for logic circuit 61 will be discussed later.

In like fashion, FIG. 11 shows that one illustrative embodiment of a differential decoder to implement the new decoding algorithm comprises a decoding logic circuit 66 having an input connected to either quantization circuit 28 or 29 (FIG. 5) and an output connected to one of the inputs to parallel-to-serial converter 31. A cascaded chain of bistable multivibrators 67–69 interconnect the input of logic circuit 66 to its output. In addition, intermediate outputs of the multivibrator chain are also connected to the logic circuit. A specific logic implementation for logic circuit 66 will be given later.

So far, the only demonstrated quality of the new differential encoding algorithm is that it overcomes data inversions just as efficiently as does the differential encoding algorithm previously discussed. It is yet to be shown that there is any advantage to the new algorithm in terms of the number of decoder output errors that will be produced by a single error at the decoder input. Recalling that in order to detect a parity violation with the 3A-RDT receiver, the number of decoder output errors must be odd, a glance at FIG. 11 might lead one to believe that each error applied to the decoder's input would result in four errors at the output; one output error occurring when the erroneous input is fed directly into decoding logic circuit 66, and three more errors occurring as the erroneous input travels down the chain of multivibrators 67–69. Fortunately, this is not the case. It is true that when the erroneous input is fed directly into decoding logic circuit 66, an output error occurs. However, as the erroneous input travels down the chain of multivibrators, it does not always force the decoder to use the wrong decoding rule. Thus, the total number of errors at the decoder output can be as little as one or as many as four, depending on the input bit pattern.

Figure 13:
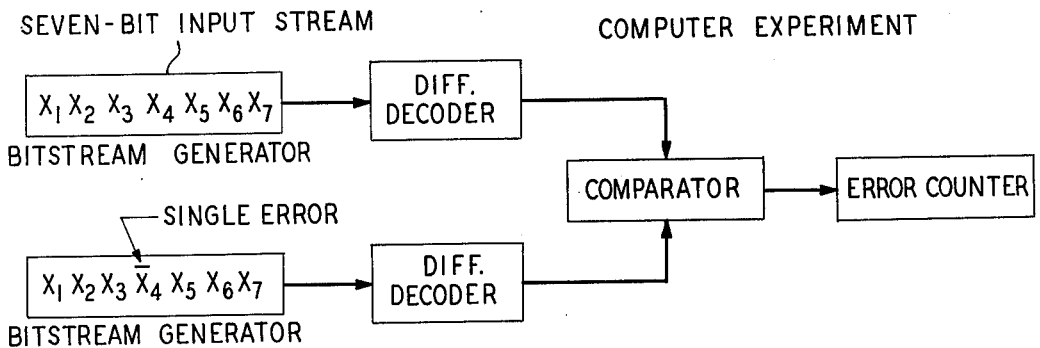
FIG. 13 is a block schematic diagram of a computer simulation which was performed on the decoder shown in FIG. 11 to verify the performance thereof.

In order to correctly analyze the distribution of output errors, a computer program was written to implement the experimental configuration shown in FIG. 13. In this experiment, a seven-bit stream of data was generated by the computer and input to the differential decoder. The stream consisted of three bits preceding the time slot in which an error was introduced, and three bits following that time slot. The output stream of the differential decoder was first calculated using the correct bit in the middle of the input stream, and then recalculated when an error was introduced in the middle of the input stream. Comparison of the output streams gave the number of output errors caused by the single error at the input. The same operation was repeated for all $2^7$ possible input streams. Analysis of the results shows that the number of output errors ranged from 1 to 4 with a distribution as tabulated in Table B, below.

TABLE B

DISTRIBUTION OF ERRORS AT DECODER OUTPUT GIVEN A SINGLE ERROR AT DECODER INPUT

| NO. OF ERRORS AT DECODER OUTPUT | CORRESPONDING PROBABILITY OF OCCURRENCE |
|---|---|
| 1 | .125 |
| 2 | .375 |
| 3 | .375 |
| 4 | .125 |

Following parallel-to-serial conversion, the data is passed through the descrambler before the Violation Monitor and Remover checks for parity violations. As previously mentioned, the descrambler will produce three errors at its output for every error applied to its input. Thus, the distribution of errors at the output of the descrambler is as shown in Table C, below.

TABLE C

DISTRIBUTION OF BIT ERRORS AND PARITY VIOLATIONS AT DESCRAMBLER OUTPUT

| NO. OF ERRORS AT DESCRAMBLER OUTPUT | NO. OF PARITY VIOLATIONS AT DESCRAMBLER OUTPUT | CORRESPONDING PROBABILITY OF OCCURRENCE |
|---|---|---|
| 3 | 1 | .125 |
| 6 | 0 | .375 |
| 9 | 1 | .375 |
| 12 | 0 | .125 |

Using this distribution, it is possible to calculate the expected number of errors at the descrambler output, given a single error at the input to one of the differential decoders.

Expected no. of errors out of descrambler = $(1/8)(3) + (3/8)(6) + (3/8)(9) + (1/8)(12) = 7.5$ A parity violation will occur only when an odd number of errors appears at the descrambler output. Thus, the expected number of parity violations, given a single error at the input to one of the differential decoders, can also be calculated using the distribution of Table C.

$$\text{Expected no. of parity violations} = \frac{(1/8)(1) + (3/8)(0) + (3/8)(1) + (1/8)(0) = 1/2}$$

The average ratio of bit errors to parity violations can now be found.

$$\text{Ratio of bit errors to parity violations} = (7.5)/(1/2) = 15$$

This last result is the information needed in order to determine the bit error rate from the only quantity the Violation Monitor and Remover can measure directly—the number of parity violations in a specified period of time. The conversion is as follows:

$$\text{BER} = \frac{\text{bits in error}}{\text{bits transmitted}}$$
$$= \frac{\text{no. of parity violations}}{\text{no. of seconds}}$$
$$\times \frac{15 \text{ bit errors}}{1 \text{ parity violation}}$$
$$\times \frac{1 \text{ second}}{44.736 \times 10^6 \text{ bits transmitted}}$$

By using this expression, the bit error rates at which protection switches are initiated and released can be determined. In the illustrative 3A-RDS system, the Violation Monitor and Remover is implemented in such a way that a protection switch is initiated if 31 parity violations occur in 2 seconds or less, and any existing switch is released if, in a 10-second interval, fewer than 15 new parity violations occur. Substitution of these numbers in the above expression yields the result that a protection switch is initiated whenever the $\text{BER} \geq 5.2 \times 10^{-6}$, and an existing switch is released whenever the $\text{BER} < 5.0 \times 10^{-7}$.

Figure 14:
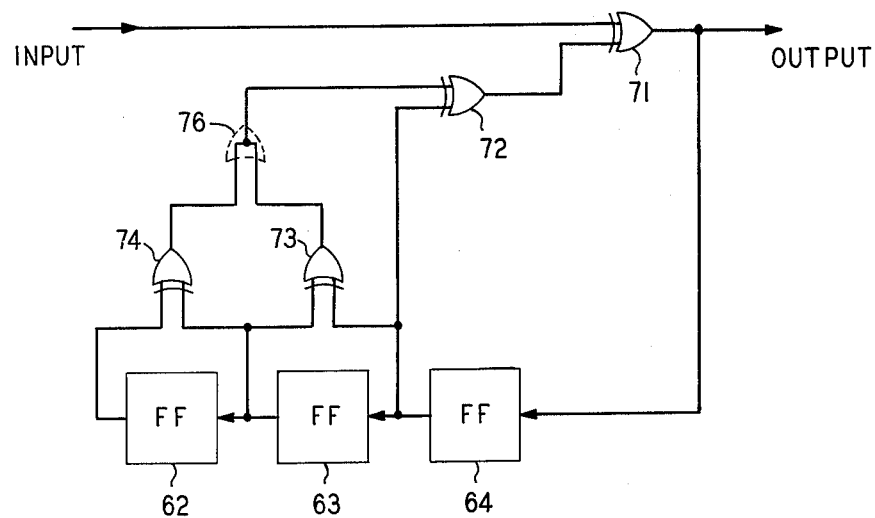
FIG. 14 is a more detailed drawing of the differential encoder shown in FIG. 10.
Figure 15:
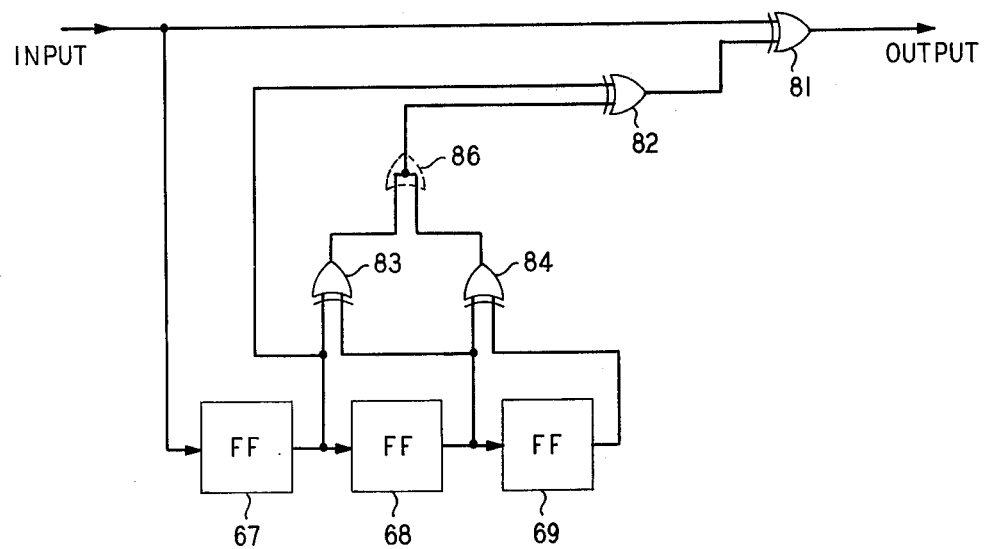
FIG. 15 is a more detailed drawing of the differential decoder shown in FIG. 11.

Having demonstrated the desirable properties of the new differential encoding/decoding algorithm, it would seem appropriate to discuss the hardware necessary for its implementation. FIGS. 14 and 15 respectively depict an illustrative embodiment of the encoder and decoder. It will be self-evident that the logic needed is modest considering the lengthy written description of the encoding and decoding rules. More specifically, the illustrative embodiment of the differential encoder comprises an exclusive OR-gate 71 having one input connected to the incoming data stream and another input connected to the output of a second exclusive OR-gate 72. One input of OR-gate 72 is connected to the output of bistable multivibrator 64 and to one input of a third exclusive OR-gate 73. The other input to OR-gate 73 is the output of multivibrator 63 which also connects to one input of a fourth exclusive OR-gate 74, the other input of which connects to the output of multivibrator 62.

The outputs of OR-gates 73 and 74 are connected together to form a wired OR-gate 76 whose "output" is connected to the other input of OR-gate 72. Conventional clock circuits, power supplies, etc., have been omitted from FIG. 14 to avoid clutter. In like fashion, the illustrative embodiment of the differential decoder comprises an exclusive OR-gate 81 having one input connected to the incoming data stream and another input connected to the output of a second exclusive OR-gate 82. One input to OR-gate 82 comprises the output of multivibrator 67 whose input is also connected to the incoming data stream. The output of multivibrator 67 also connects to one input of a third exclusive OR-gate 83. The output of multivibrator 68 is connected both to the other input of exclusive OR-gate 83 and to one input of a fourth exclusive OR-gate 84, the other input of which connects to the output of multivibrator 69. The output of OR-gates 83 and 84 are connected together to form a wired OR-gate 86, the "output" of which is connected to the other input of OR-gate 82. As with FIG. 14, conventional power supplies, clock circuits, etc., have been omitted. Extensive use of the exclusive OR function results in a realization requiring only 1 integrated circuit for each encoder in the digital transmitter and only 1 integrated circuit for each decoder in the digital receiver. Any comparable interconnection of logic elements which results in the same truth table could, of course, be used as an alternative embodiment and is encompassed by the claimed invention herein.

Since the encoding and decoding circuits were designed on the basis of matching a truth table derived from the word descriptions in the encoding and decoding algorithms, little intuitive motivation for the logic gate interconnections shown in FIG. 11 can be given. However, it is worth noting that the output of the fictitious wired OR-gate 76 in the encoder is a logical "0" only if the last three encoder outputs were all the same. Likewise, in the decoder the output of wired OR-gate 86 is a logical "0" only if the last three inputs were all the same.

It is interesting to observe that the previously discussed encoding and decoding algorithms (Encoding Rules I(a), I(b), II(a) and II(b) and Decoding Rules I(a), I(b), II(a) and II(b), respectively) will also work if every reference to a logical "0" is replaced by a logical "1" and every reference to a logical "1" is replaced by a logical "0". Why this is so is not fully understood; nor has this embodiment of the invention been exhaustively tested by computer simulation. Nevertheless, this second embodiment appears to work for every test situation that has been given to it.

In order to obtain several of the previously derived results, it was assumed that the descrambler generates three errors at its output for every error delivered to its input by the differential decoder. The important property of the descrambler's multiplying factor of three is that it is an odd number. When the number of errors at the output of the differential decoder is odd, the descrambler's odd multiplying factor ensures that the number of errors at the descrambler's output will also be odd; thus, preserving the parity violation to be detected by the Violation Monitor and Remover. There are many scrambler/descrambler combinations which do not have reliable, odd multiplying factors and, thus, are not suitable for use in 3A-RDS. It is therefore instructive to review some of the considerations which led to the design of the 3A-RDT scrambler/descrambler and how such considerations are compatible with the instant encoding scheme.

Figure 16:
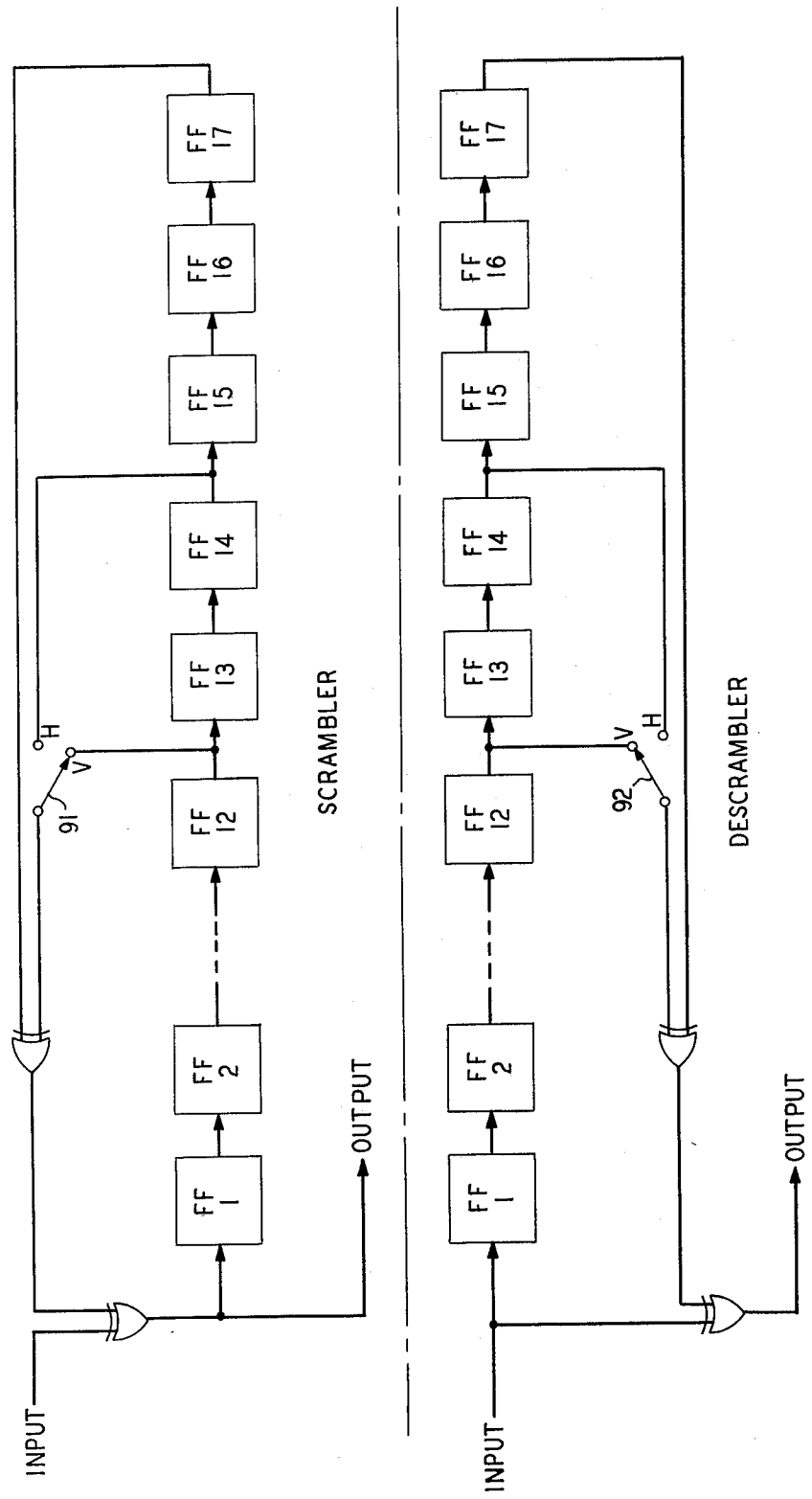
FIG. 16 is a block schematic diagram of an illustrative data scrambler/descrambler employed in the transmitter and receiver shown in FIGS. 1 and 2, respectively.
Figures 17, 18:
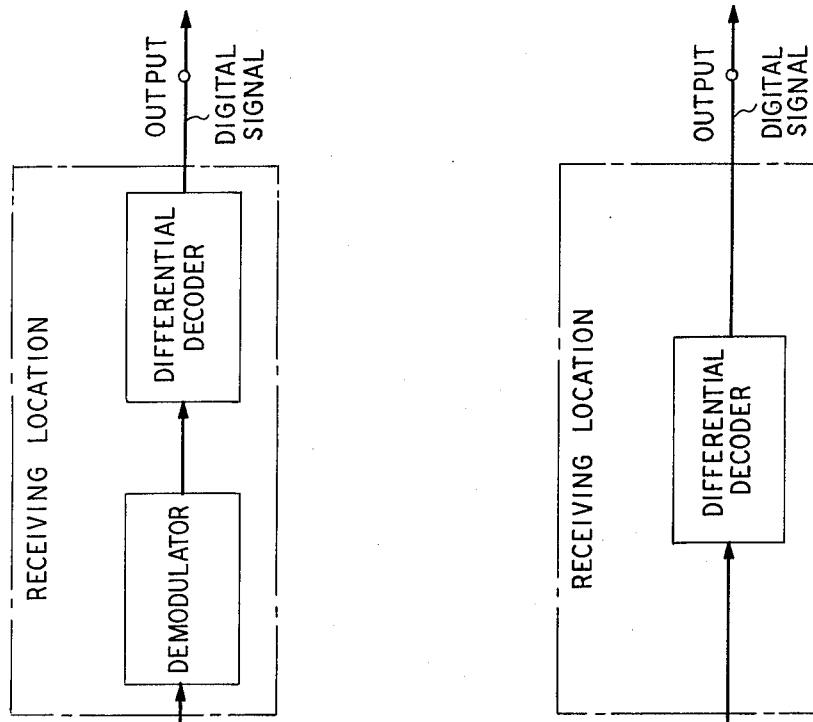
FIG. 17 is a block schematic drawing illustrating the use of the invention over a conventional modulation system.
FIG. 18 is a block schematic drawing illustrating the use of the invention over a single metallic pair.

FIGS. 16 and 17 respectively depict the self-synchronizing scrambler and descrambler used in the 3A-RDT. The switches 91 and 92 are put into the H position whenever the radio channel over which the digital signal is sent is horizontally polarized, and into the V position when the radio channel is vertically polarized. Had this feature not been provided, some equipment failure modes which result in a receiver of one polarization receiving a signal from a transmitter of the opposite polarization could have gone undetected by the Violation Monitor and Remover in the receiver. However, regardless of the position of the switches, the scrambler and descrambler have feedback taps at points appropriate for generation of maximal-length shift-register sequences.

The descrambler's multiplying factor of three occurs primarily because an erroneous bit from a differential decoder will cause an error when it arrives at the descrambler's input; another error when it arrives at either the 12th or 14th shift-register stage (depending on the position of switch 92); and a third error when it arrives at the 17th shift-register stage. Scrambler/descrambler designs having only two feedback taps are not suitable since for 3A-RDS, they have an even multiplying factor.

There is one additional complication; for the hypothesized single error caused by noise which appears at the output of the quantization circuit on one of the two data rails, the differential decoder on that rail will produce from one to four errors. After parallel-to-serial conversion, the bits from that rail appear alternately in the serial bit stream. There thus exists the possibility that, if the feedback tap is not wisely positioned, an erroneous bit could arrive at the feedback tap at the same time that an erroneous bit arrives at the 17th stage. The result would be a cancellation of the errors since two erroneous inputs to the exclusive OR-gate in the feedback path would produce a correct output. This would be beneficial from the standpoint of reducing the total number of errors at the descrambler output, but it would be detrimental in the sense that the descrambler's multiplying factor would be dependent on the bit stream rather than being a constant. This, in turn, would affect the occurrence of odd numbers of errors at the descrambler output and the use of the DS3 parity bit by the Violation Monitor and Remover. The problem is solved in the 3A-RDT scrambler/descrambler design by putting the feedback tap an odd number of stages away from the final stage. Thus, the multiple errors occurring on a single data rail can never simultaneously load the feedback tap and the final stage with errors and cannot cause the error cancellation effect.

A problem similar to the one just described can occur if simultaneous errors occur at the feedback tap and the descrambler input. This problem is easily overcome in the 3A-RDT. With the design of the differential decoder, multiple errors disclosed herein at the decoder output are contained within a four-bit spread. After parallel-to-serial conversion, the errors are contained with a seven-bit spread, and, since the feedback tap is located more than seven stages from the descrambler input, error cancellation does not occur.

Shortly after the invention of the encoding/decoding algorithm disclosed and claimed herein, models of the encoder and decoder were tested in a laboratory environment and then adopted for use in 3A-RDS. Verification of the insensitivity to the phase state of the recovered carrier was followed by measurements utilizing the DS3 Error Rate Test Set which confirmed that the average ratio of bit errors to parity violations was, as predicted, equal to 15. In addition, spectral measurements of the output signals of the 3A-RDT transmitter and the TN-1 11 GHz microwave transmitter showed no evidence that the addition of the encoders disturbed the random properties of the data enough to cause discrete spectral lines.

It must be again emphasized that while the invention has been disclosed in a specific environment, i.e., the 3A Radio Digital System, it is not so limited and may be used with equal success in other digital transmission systems where differential encoding is needed to resolve phase ambiguity or to compensate for inversion of binary information, while at the same time the generation of even numbers of errors at the output of the differential decoder as a result of a single error at the decoder input must be avoided.

Indeed, one skilled in the art will appreciate that, as shown in FIG. 17, the invention may readily be employed with any modulation scheme and transmission system provided, of course, that such modulation scheme and transmission system are otherwise suitable for the transmission of digital data. As shown in FIG. 18, the encoding scheme may also be used with a baseband transmission scheme over a metallic pair. Also, while 3A-RDS employs binary digital data there is nothing about the encoding algorithm that restricts it to binary data and it is equally applicable to bipolar, or multilevel digital transmissions.

One skilled in the art may make various changes and substitutions to the equipment and components shown without departing from the spirit and scope of the invention.

What is claimed is:

1. An improved method of transmitting a digital signal from a first to a second location, which comprises the steps of:

at said first location, splitting said digital signal into first and second digital signals at half the bit rate of the original digital signal, said first and second digital signals being carried on first and second parallel data rails respectively and being offset with respect to one another by one-half bit interval;

phase-modulating a carrier wave of fixed frequency and amplitude with the first and second digital signals on said data rails; and then transmitting the modulated carrier wave from said first to said second location, wherein the improvement comprises:

prior to said phase-modulating step, differentially encoding the digital signal on each data rail in a differential encoder according to the following encoding algorithm:

If the last three outputs of the differential encoder were all the same, implement encoding Rule I, otherwise implement encoding Rule II.

Encoding Rule I:
(a) If the input to the encoder is a first logical condition, make the output of the encoder the logical equivalent of the previous output;
(b) If the input to the encoder is a second logical condition, make the output of the encoder the logical complement of the previous output:

Encoding Rule II:
(a) If the input to the encoder is said first logical condition, make the output of the encoder the logical complement of the previous output;
(b) If the input to the encoder is said second logical condition, make the output of the encoder the logical equivalent of the previous output.

2. The method according to claim 1 wherein said first logical condition is a logical "0" and said second logical condition is a logical "1".

3. The method according to claim 1 wherein said first logical condition is a logical "1" and said second logical condition is a logical "0".

4. The method according to claim 1 comprising the further steps of:
  at said second location, demodulating said phase-modulated carrier wave to derive on first and second parallel data rails said first and second digital signals respectively; and then,
  interleaving said first and second digital signals to obtain the original digital signal, wherein the improvements comprises:
  prior to said interleaving step, differentially decoding the digital signal on each data rail in a differential decoder according to the following decoding algorithm:
  if the last three inputs to the differential decoder were all the same, implement decoding Rule I, otherwise implement decoding Rule II.

Decoding Rule I:
  (a) If the input to the decoder is the logical equivalent of the previous input, make the decoder output a first logical condition;
  (b) If the input to the decoder is the logical complement of the previous input, make the decoder output a second logical condition;

Decoding Rule II:
  (a) If the input to the decoder is the logical complement of the previous input, make the decoder output said first logical condition;
  (b) If the input to the decoder is the logical equivalent of the previous input, make the decoder output said second logical condition.

5. The method according to claim 4 wherein said first logical condition is a logical "0" and said second logical condition is a logical "1".

6. The method according to claim 4 wherein said first logical condition is a logical "1" and said second logical condition is a logical "0".

7. An improved method of transmitting a digital signal from a first to a second location, which comprises the steps of:
  at said first location, modulating a carrier wave with said digital signal and then;
  transmitting said digital signal to said second location, wherein the improvement comprises:
  prior to said modulating step, differentially encoding the digital signal according to the following encoding algorithm:
  if the last three outputs of the differential encoder were all the same, implement encoding Rule I, otherwise implement encoding Rule II.

Encoding Rule I:
  (a) If the input to the encoder is a first logical condition, make the output of the encoder the logical equivalent of the previous output;
  (b) IF the input to the encoder is a second logical condition, make the output of the encoder the logical complement of the previous output:

Encoding Rule II:
  (a) If the input to the encoder is said first logical condition, make the output of the encoder the logical complement of the previous output;
  (b) If the input to the encoder is said second logical condition, make the output of the encoder the logical equivalent of the previous output.

8. The method according to claim 7 wherein said first logical condition is a logical "0" and said second logical condition is a logical "1".

9. The method according to claim 7 wherein said first logical condition is a logical "1" and said second logical condition is a logical "0".

10. The method according to claim 7 comprising the further steps of:
  at said second location, demodulating said modulated carrier wave to recover said digital signal, wherein the improvement comprises:
  subsequent to said demodulating step, differentially decoding the digital signal in a differential decoder according to the following decoding algorithm:
  If the last three inputs to the differential decoder were all the same, implement decoding Rule I, otherwise implement decoding Rule II.

Decoding Rule I:
  (a) If the input to the decoder is the logical equivalent of the previous input, make the decoder output a first logical condition;
  (b) If the input to the decoder is the logical complement of the previous input, make the decoder output a second logical condition;

Decoding Rule II:
  (a) If the input to the decoder is the logical complement of the previous input, make the decoder output said first logical condition;
  (b) If the input to the decoder is the logical equivalent of the previous input, make the decoder output said second logical condition.

11. The method according to claim 10 wherein said first logical condition is a logical "0" and said second logical condition is a logical "1".

12. The method according to claim 10 wherein said first logical condition is a logical "1" and said second logical condition is a logical "0".

13. A method of differentially encoding a digital bit stream comprising the steps of:
  applying said bit stream to a differential encoder, said encoder following the encoding algorithm set forth below:
  if the last three outputs of the differential encoder were all the same, implement encoding Rule I, otherwise implement encoding Rule II.

Encoding Rule I:
  (a) If the input to the encoder is a first logical condition, make the output of the encoder the logical equivalent of the previous output;
  (b) If the input to the encoder is a second logical condition, make the output of the encoder the logical complement of the previous output:

Encoding Rule II:
  (a) If the input to the encoder is said first logical condition, make the output of the encoder the logical complement of the previous output;
  (b) If the input to the encoder is said second logical condition, make the output of the encoder the logical equivalent of the previous output.

14. The method according to claim 13 wherein said first logical condition is a logical "0" and said second logical condition is a logical "1".

15. The method according to claim 13 wherein said first logical condition is a logical "1" and said second logical condition is a logical "0".

16. A method of differentially decoding a bit stream that has priorly been differentially encoded comprising the steps of:

applying said bit stream to a differential decoder, said decoder following the decoding algorithm set forth below:

if the last three inputs to the differential decoder were all the same, implement decoding Rule I, otherwise implement decoding Rule II.

Decoding Rule I:
(a) If the input to the decoder is the logical equivalent of the previous input, make the decoder output a first logical condition;
(b) If the input to the decoder is the logical complement of the previous input, make the decoder output a second logical condition;

Decoding Rule II:
(a) If the input to the decoder is the logical complement of the previous input, make the decoder output said first logical condition;
(b) If the input to the decoder is the logical equivalent of the previous input, make the decoder output said second logical condition.

17. The method according to claim 16 wherein said first logical condition is a logical "0" and said second logical condition is a logical "1".

18. The method according to claim 16 wherein said first logical condition is a logical "1" and said second logical condition is a logical "0".

19. Improved apparatus for transmitting a digital signal from a first to a second location, which comprises:

at said first location, means for splitting said digital signal into first and second digital signals at half the bit rate of the original digital signal, said first and second digital signals being applied to first and second parallel data rails, respectively, and being offset with respect to one another by one-half bit interval;

a source of a carrier signal; and a modulator, connected to said first and second data rails and to said carrier signal source, for phase-monitoring said carrier signal with said digital signal, wherein the improvement comprises:

first and second encoding means, respectively interposed in said first and second data rails between said signal splitting means and said phase modulator, for separately encoding the digital signal on each data rail according to the following algorithm:

if the last three outputs of the differential encoder were all the same implement encoding Rule I, otherwise implement encoding Rule II.

Encoding Rule I:
(a) If the input to the encoder is a first logical condition, make the output of the encoder the logical equivalent of the previous output;
(b) If the input to the encoder is a second logical condition, make the output of the encoder the logical complement of the previous output:

Encoding Rule II:
(a) If the input to the encoder is said first logical condition, make the output of the encoder the logical complement of the previous output;
(b) If the input to the encoder is said second logical condition, make the output of the encoder the logical equivalent of the previous output.

20. The apparatus according to claim 19 wherein said first logical condition is a logical "0" and said second logical condition is a logical "1".

21. The apparatus according to claim 19 wherein said first logical condition is a logical "1" and said second logical condition is a logical "0".

22. The apparatus according to claim 19 wherein said first and second encoding means each comprise:

a first exclusive OR-gate having one input connected to a corresponding data rail;

first, second and third cascaded bistable multivibrators, the input to said first multivibrator being connected to the output of said first exclusive OR-gate;

a second exclusive OR-gate having one input connected to the output of said third multivibrator and another input connected to the output of said second multivibrator;

a third exclusive OR-gate having one input connected to the output of said second multivibrator and another input connected to the output of said first multivibrator; and a fourth exclusive OR-gate having one input connected to the output of said first multivibrator and another input connected to the output of both said second and said third exclusive OR-gate, the output of said fourth exclusive OR-gate being connected to the other input of said first exclusive OR-gate.

23. Improved apparatus for receiving a digital signal which has been transmitted from a first to a second location by means of a carrier wave which has been phase-modulated by said digital signal, which comprises:

at said second location, means, connected to the source of the incoming digital signal, for generating a local version of said carrier wave;

first and second demodulators, connected to said carrier wave generating means, for respectively generating on first and second parallel data rails first and second digital signals at half the bit rate of the original incoming digital signal; and means for combining said first and second digital signals into said original digital signal, wherein the improvement comprises:

first and second decoding means, respectively interposed in said first and second data rails between said first and second demodulators and said combining means, for separately decoding the digital signal on each data rail according to the following algorithm:

if the last three inputs to the differential decoder were all the same, implement decoding Rule I, otherwise implement decoding Rule II.

Decoding Rule I:
(a) If the input to the decoder is the logical equivalent of the previous input, make the decoder output a first logical condition;
(b) If the input to the decoder is the logical complement of the previous input, make the decoder output a second logical condition.

Decoding Rule II:
(a) If the input to the decoder is the logical complement of the previous input, make the decoder output said first logical condition;
(b) If the input to the decoder is the logical equivalent of the previous input, make the decoder output said second logical condition.

24. The apparatus according to claim 23 wherein said first logical condition is a logical "0" and said second logical condition is a logical "1".

25. The apparatus according to claim 23 wherein said first logical condition is a logical "1" and said second logical condition is a logical "0".

26. The apparatus according to claim 23 wherein said first and second decoding means each comprise:
- a first exclusive OR-gate having one input connected to a corresponding data rail;
- first, second and third cascaded bistable multivibrators, the input to said first multivibrator being connected to said data rail;
- a second exclusive OR-gate having one input connected to the output of said second multivibrator and another input connected to the output of said third multivibrator;
- a third exclusive OR-gate having one input connected to the output of said first multivibrator and another input connected to the output of said second multivibrator; and
- a fourth exclusive OR-gate having one input connected to the output of both said second and said third exclusive OR-gates and another input connected to the output of said first multivibrator, the output of said fourth exclusive OR-gate being connected to the other input of said first exclusive OR-gate.

27. An improved differential encoder for differentially encoding a digital bit stream which comprises:
- means for examining successive bits in said bit stream, said examining means generating an output bit which is identical to the previous output bit if the bit currently under examination is a first logical condition and an output bit which is the logical complement of the previous output bit if the bit currently under examination is a second logical condition, wherein the improvement comprises:
- means for examining the last three bits output from said examining means and, if said last three output bits were not all logical equivalents, modifying the operation of said examining means such that said examining means generates an output bit which is the logical complement of the previous output bit if the bit currently under examination is said first logical condition and an output bit which is identical to the previous output bit if the bit currently under examination is a second logical condition.

28. The apparatus according to claim 27 wherein said first logical condition is a logical "0" and said second logical condition is a logical "1".

29. The apparatus according to claim 27 wherein said first logical condition is a logical "1" and said second logical condition is a logical "0".

30. An improved differential decoder for differentially decoding a digital bit stream which has priorly been differentially encoded, said decoder comprising:
- means for examining successive bits in said bit stream, said examining means generating an output bit which is a first logical condition if the input bit currently under examination is the logical equivalent of the previous input bit and an output bit which is a second logical condition if the input bit currently under examination is the logical complement of the previous input bit, wherein the improvement comprises:
- means for examining the last three bits input to said examining means and, if said last three input bits were not all logical equivalents, modifying the operation of said examining means such that said examining means generates an output bit which is said first logical condition if the input bit currently under examination is the logical complement of the previous input bit and an output bit which is said second logical condition if the input bit currently under examination is the logical equivalent of the previous input bit.

31. The apparatus according to claim 30 wherein said first logical condition is a logical "0" and said second logical condition is a logical "1".

32. The apparatus according to claim 30 wherein said first logical condition is a logical "1" and said second logical condition is a logical "0".

* * * * *

UNITED STATES PATENT AND TRADEMARK OFFICE
CERTIFICATE OF CORRECTION

PATENT NO. : 4,092,491

DATED : May 30, 1978

INVENTOR(S) : Gerald L. Frazer

It is certified that error appears in the above-identified patent and that said Letters Patent are hereby corrected as shown below:

Column 8, line 62, "docoder" should read --decoder--.
Column 10, line 66, "differenet" should read --different--.
Column 21, line 41, "monitoring" should read --modulating--.

Signed and Sealed this

Twentieth Day of March 1979

[SEAL]

Attest:

RUTH C. MASON
Attesting Officer

DONALD W. BANNER
Commissioner of Patents and Trademarks